Figure 1:
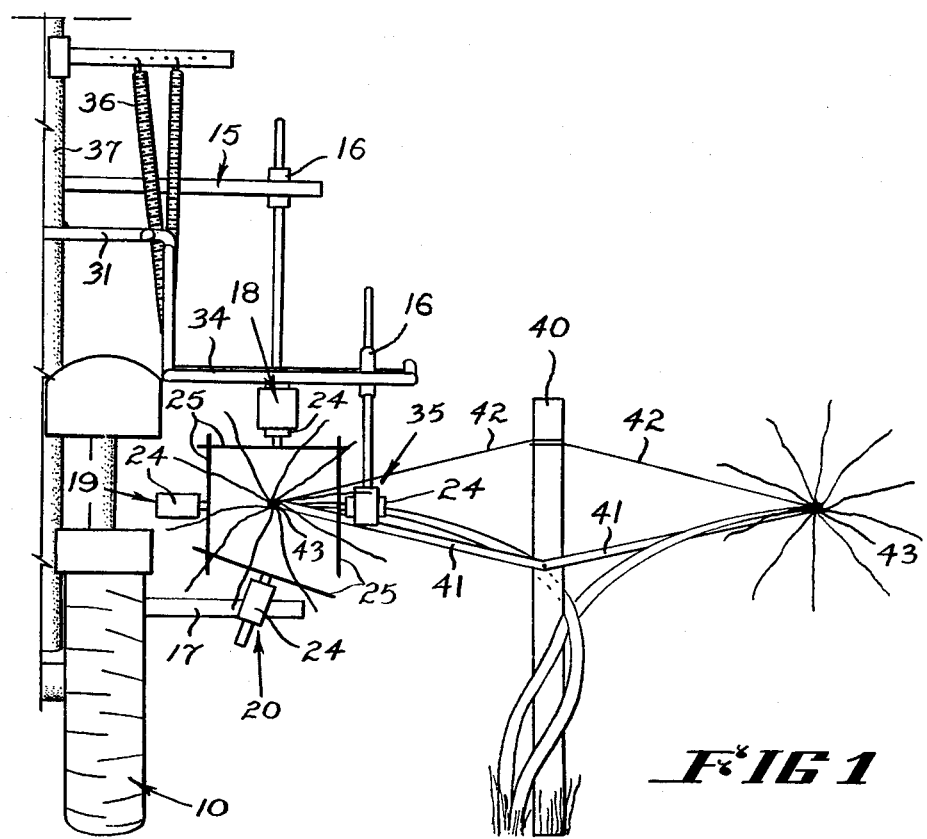

United States Patent [19]

Pollock

[11] 4,206,585

[45] Jun. 10, 1980

[54] VINE PRUNING MEANS AND METHOD

[76] Inventor: John R. Pollock, Silver City Hwy., Buronga, New South Wales, Australia

[21] Appl. No.: 934,872

[22] Filed: Aug. 18, 1978

[51] Int. Cl.² .......................................... A01D 55/18
[52] U.S. Cl. ........................................ 56/235; 56/330
[58] Field of Search ............... 56/233, 234, 235, 236, 56/237, 330

[56] References Cited

U.S. PATENT DOCUMENTS

| | | | |
|---|---|---|---|
| 1,627,258 | 5/1927 | Sullivan | 56/237 |
| 2,483,772 | 10/1949 | Holmes | 56/237 |
| 2,798,354 | 7/1957 | O'Brien et al. | 56/235 |
| 2,926,480 | 3/1960 | Kimball | 56/235 |
| 2,940,486 | 6/1960 | Whitmore | 56/237 |
| 3,192,695 | 7/1965 | Leydig et al. | 56/235 |
| 3,214,895 | 11/1965 | Leydig et al. | 56/235 |
| 3,330,068 | 7/1967 | Carson | 56/235 |
| 3,415,046 | 12/1968 | Leydig et al. | 56/235 |
| 3,597,908 | 8/1971 | Schaefer | 56/233 |
| 3,685,264 | 8/1972 | Littau | 56/234 |
| 3,913,304 | 10/1975 | Jodoln | 56/235 |
| 4,067,178 | 1/1978 | Miller | 56/235 |

FOREIGN PATENT DOCUMENTS

| | | | |
|---|---|---|---|
| 2290833 | 11/1974 | France | 56/235 |
| 2230285 | 12/1974 | France | 56/235 |
| 2270779 | 12/1975 | France | 56/235 |
| 2284278 | 4/1976 | France | 56/235 |
| 564073 | 9/1944 | United Kingdom | 56/235 |
| 912239 | 12/1962 | United Kingdom | 56/233 |

*Primary Examiner*—Russell R. Kinsey
*Assistant Examiner*—Paul J. Hirsch
*Attorney, Agent, or Firm*—Norbert P. Holler; Charles A. Blank

[57] ABSTRACT

A vehicle has a main frame which is adjustable for height, and a swivel frame pivoted to the main frame. There are at least three driven saws on the frames, and at least one of those is on the swivel frame. The saws are arranged to cut canes which extend respectively upwardly, outwardly and inwardly of a vine which is carried on a trellis wire.

6 Claims, 3 Drawing Figures

VINE PRUNING MEANS AND METHOD

This invention relates to a means for pruning canes from vines which are supported on trellis wires, and the invention further relates to a method of pruning vines wherein such means are employed.

BACKGROUND OF THE INVENTION

In order to facilitate so called "mechanical" harvesting of grapes, many vineyards are now provided with rows of posts, each post having upwardly and outwardly sloping iron trellis arms pivoted thereto, and supported by an upwardly and inwardly sloping wires, the arrangement being such that the trellis wires are carried on the ends of the trellis arms, and the vines supported by the trellis wires can be vigourously shaken by a mechanical shaker so as to remove bunches of ripe grapes from the vines.

However, heretofore pruning has usually been a manual or semi-manual operation wherein an operator has separately severed each cane, arranged the remaining canes in such a way that they normally lie on and are thereby supported by the trellis wires, but it has been noted that such removal of the canes normally is effected by cutting all or nearly all of the canes which project outwardly from the trellis wires.

Attempts have been made heretofore to mechanise pruning, and reference is made to U.S. Pat. No. 2,940,486 (Whitmore) wherein a vertical row of saws is associated with a horizontal row of saws, but a device such as described and illustrated therein would be unsuitable for pruning vineyards owing to absence of a frame which can be swivelled to accommodate variations in height of the trellis, cross-bar, or inclination of the ground.

The U.S. Pat. No. 4,067,178 (Miller) discloses a device having a swivel arm arrangement for supporting saws, but such a device is also unsuitable for pruning canes from vines because of its inability to cut inside, top and outside canes simultaneously.

BRIEF SUMMARY OF THE INVENTION

In this invention a vehicle has a main frame which is adjustable for height, and a swivel frame pivoted to the main frame. There are at least three driven saws on the frames, and at least one of those is on the swivel frame. The saws are arranged to cut canes which extend respectively upwardly, outwardly and inwardly of a vine which is carried on a trellis wire.

Specifically the invention consists of means for the pruning of canes from vines which are supported by trellis wires carried by posts, comprising a frame assembly having a main frame, a swivel frame, and pivot means connecting the swivel frame to the main frame for swivel movement in at least a vertical plane, securing means on the main frame for securing the frame to a vehicle, and height adjustment means operatively located between the frame and the vehicle for adjusting the height of the frame with respect to the ground, at least three saws carried by the frame: a first said saw being an upper saw in a generally horizontal plane arranged to cut vine canes extending upwardly from the trellis wire;

a second said saw being an outer saw in a generally vertical plane arranged to cut vine canes extending outwardly from the trellis wire in a direction towards the vehicle;

and a third said saw being an inner saw also in a generally vertical plane spaced from the first said vertical plane, arranged to cut vine canes extending inwardly from the trellis wire in a direction away from the vehicle, power means coupled to each respective said saw for rotationally driving that said saw, at least the third of said saws being carried by the swivel frame.

Conveniently the arrangement is such that the frame is carried on a tractor, either with a height control device for example, a hydraulic ram on a tractor, or alternatively carried by the elevating portion of a fork lift frame of the tractor so that inbuilt height control devices of the tractor can be made use of. Still further, the pruning means may be attached to a harvester so that pruning can follow harvesting for example of grapes.

In another aspect of the invention, a method of pruning canes from grape vines which are supported on spaced trellis wires carried by trellis arms themselves supported by trellis arm holding wires, comprises moving a plurality of rotationally driven circular saws in the direction of the trellis wires, the saws being spaced from the trellis wires, and the saws being operated over an area such that canes which extend inwardly, upwardly and outwardly from the trellis wires are severed by the saws, and raising a said saw arranged to sever the inwardly extending canes from the trellis as it passes each said trellis arm so as to avoid the trellis arm.

BRIEF DESCRIPTION OF DRAWINGS OF PREFERRED EMBODIMENTS OF THE INVENTION

Figure 2:
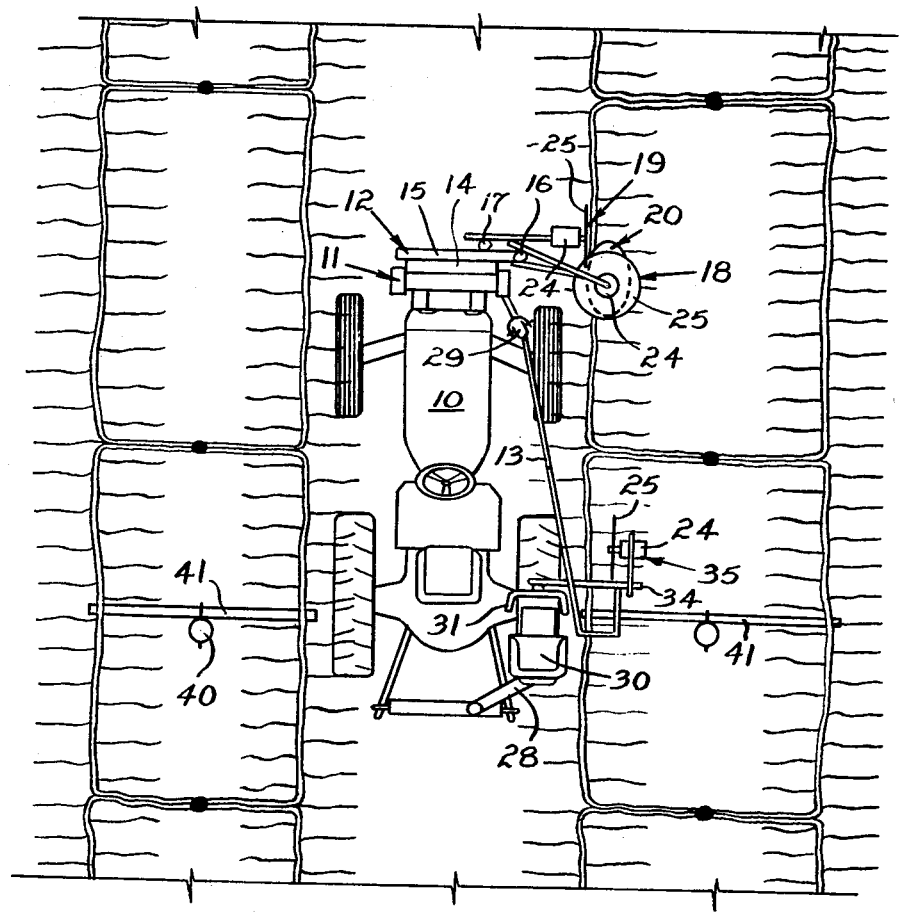
Figure 3:
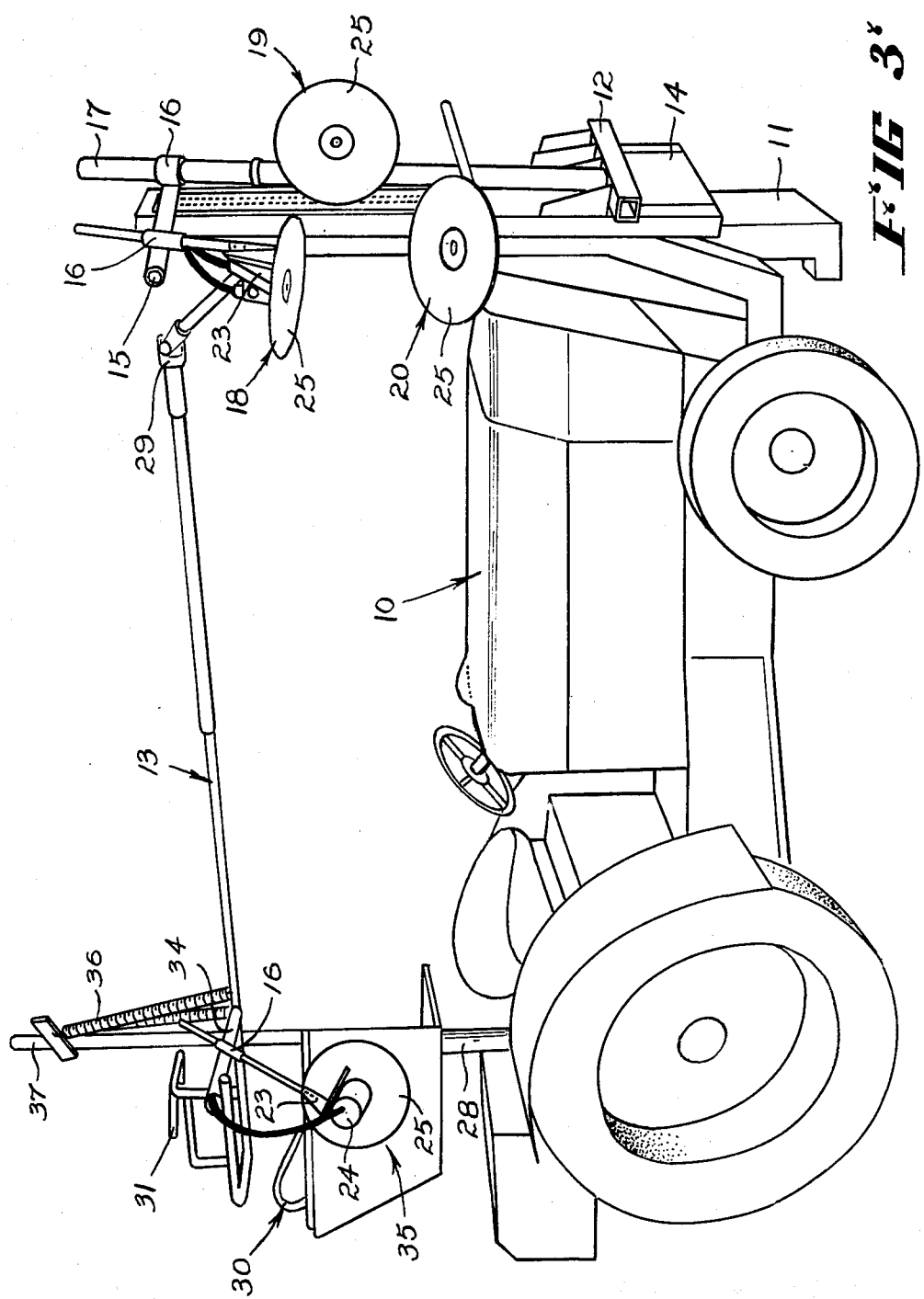

Embodiments of the invention are described hereunder in some detail with reference to and are illustrated in the accompanying drawings, in which:

FIG. 1 is a fragmentary diagrammatic end elevation which illustrates means for pruning canes from vines carried on one of a pair of spaced parallel trellis wires, FIG. 2 is a plan view of FIG. 1, and FIG. 3 is a perspective view of FIG. 2.

In the embodiment of FIGS. 1, 2 and 3, a tractor is provided with a fork lift device 11 (without the forks), and associated with the fork lift device 11 of course there is a fork lift hydraulic cylinder, not shown in the drawings. It is frequently convenient to use such a device, but if not, then a tractor is provided with vertical guide means at its front end, a carriage guided for vertical movement and a hydraulic ram coacting between the guide means and the carriage for effecting raising and lowering of the carriage.

A frame assembly comprises a main frame 12 and a swivel frame 13. The main frame 12 is clamped to the fork lift carriage 14 so that the main frame 12 can be raised and lowered, the main frame having an upper outstanding arm 15, and the outstanding arm 15 has near its outer end clamps 16 which secure three frame arms 17 adjustably for position, the frame arms having arranged on them respective saw heads 18, 19 and 20. Each saw head comprises a bracket mounting (all designated 23), a hydraulic motor 24 and a circular saw blade 25 secured to the motor 24. The uppermost blade 25 is set horizontally or nearly horizontally; the blade 25 closest the tractor is the outermost blade in respect of the trellis wire and this is set vertically or nearly vertically, and the lowest blade 25 lies in a plane which is inclined to the horizontal to slope outwardly and downwardly away from the tractor 10, as best seen in FIG. 1.

The tractor 10 is provided near its rear end with a separate frame which is a support frame 28, and the swivel frame 13 extends forwardly from a locality adjacent the support frame 28, and is pivotally connected to the main frame 12 by a universal joint 29. The support frame 28 supports a seat 30, and the rear end of the swivel frame 13 terminates in a handle bar 31, so that an operator on seat 30 can raise, lower or move sideways the rear end of the swivel frame 13. The rear end of swivel frame 13 has extending outwardly therefrom a rear arm 34 (similar to front arms 17), and a further clamp 16 secures an inner saw head 35 thereto, in like manner to the saw heads 18, 19 and 20 at the front of the tractor 10. The saw blade 25 lies in a substantially vertical plane. The weight of the saw head 35 and its support means is counter balanced by means of a spring 36 depending from a mast 37 (FIG. 5).

Hydraulic hoses and valve means (not shown) are associated with the hydraulic motors and connect the motors to the hydraulic equipment of the tractor so that the saws are caused to rotate simultaneously but with independant control of each motor speed.

FIG. 1 illustrates the trellis configuration with which the pruning device of this embodiment may be associated. Each post 40 of a row of posts carries two upwardly and outwardly sloping arms 41, suspended at their outer ends by tension wires 42 from the top of post 40, and these outer ends support the trellis wires 43 which in turn carry the vine canes.

In use, the tractor 10 is driven by a first operator between two rows of vines and the canes on the side nearest the tractor are severed adjacent the trellis wires, the height being adjusted by the height adjustment means of the fork lift carriage 14 of the tractor, and the in/out position being adjusted by steering of the tractor. When the tractor is correctly positioned, the inner saw is lowered by a second operator on seat 30 to sever the canes between trellis arms and vine arm, being lifted at the locality of the trellis arms or vine arms and lowered again between the next pair of trellis arms or vine arms to be traversed by the tractor.

In a variation of the above embodiment (not herein illustrated), the fourth or inner saw head 35 is carried on the rear arm 34 as described above, but the rear arm 34 is movable but only in a vertical plane, and the arm 34 is associated with a wheel (preferably pneumatic tyred and larger diameter than the saw blade, and having its periphery such that the saw blade is lifted over the trellis arm holding wires as the trellis arms are traversed by the tractor). Once again counterweighting or spring balancing of the swinging arm is required.

In other instances the canes may be, not just too dense, but also so heavy that it is inconvenient to control the saws directly by hand. In such a case a carriage is mounted on the tractor and near the driver, the carriage having both horizontal and vertical movements controlled by valve means, also adjacent the driver.

The embodiments have been described with respect to circular saws, but, the necessary changes being made, reciprocating blade saws may be used.

A consideration of the above embodiment will indicate that the invention provides the means whereby the canes can be severed from the trellis wires, and it also provides a method of severing the canes, thereby greatly reducing the amount of handling required in pruning of grape vines. Surprisingly, grape yield is increased by the method of this invention. The invention is not limited to grape vines and can be extended to any other vines which are supported on trellises in that manner.

I claim:

1. Means for the pruning of canes from vines which are supported by trellis wires carried by posts, comprising:
 a frame assembly having a main frame, a swivel frame, and pivot means connecting the swivel frame to the main frame for swivel movement of the swivel frame with respect to the main frame in at least a vertical plane,
 securing means on the main frame for securing the frame assembly to a vehicle, and height adjustment means operatively located between the frame assembly and the vehicle for adjusting the height of the frame assembly with respect to the ground,
 at least three saws carried by the frame assembly:
 a first said saw being an upper saw carried on the main frame to lie in a generally horizontal plane arranged to cut vine canes extending upwardly from the trellis wire;
 a second said saw being an outer saw carried on the main frame to lie in a generally vertical plane arranged to cut vine canes extending outwardly from the trellis wire in a direction towards the vehicle; and
 a third said saw being an inner saw also in a generally vertical plane spaced from the first said vertical plane, arranged to cut vine canes extending inwardly from the trellis wire in a direction away from the vehicle, and
 power means coupled to each respective said saw for rotationally driving that said saw,
 the third of said saws being carried by the swivel frame so as to be capable of being raised or lowered with respect to said first and second saws.

2. Means for the pruning of canes from vines according to claim 1 wherein all said saws are circular saws, and wherein said first and second saws are located at the front of the vehicle and said third saw at the rear of the vehicle.

3. Means for the pruning of canes from vines according to claim 1 wherein said pivot means comprises a universal joint between the front end of the swivel frame and the main frame, said third saw being on the rear end of said swivel frame, a handle bar also on the rear end of said swivel frame, and a seat carried by the vehicle located with respect to said handle bar so that an operator when seated on the seat can raise and lower said third saw and also move said third saw in a transverse direction.

4. Means for the pruning of canes from vines according to claim 3 wherein said vehicle has an upstanding mast, and a tension spring between the mast and the swivel frame counterbalances the weight of the swivel frame.

5. Means for the pruning of canes from vines according to claim 3 further comprising outstanding arms, frame arms, clamps joining the outstanding arms to the frame arms, respective securing means joining each of said outstanding arms to one or other of said frames, and a saw head on each respective frame arm, said power means being a hydraulic motor on each respective saw head, and a said saw on the output shaft of each respective said hydraulic motor.

6. Means for the pruning of canes from vines according to claim 3 comprising, in addition, a fourth saw which is a lower saw and which slopes in a direction downwardly and outwardly from the vehicle.

* * * * *